Patented May 25, 1954

2,679,464

UNITED STATES PATENT OFFICE 2,679,464

CARBONATION PROCESS

Somers Moore, Woodland, Calif., assignor to Spreckels Sugar Company, San Francisco, Calif., a corporation of California No Drawing. Application August 13, 1951, Serial No. 241,690

7 Claims. (Cl. 127—50)

My invention relates to the purification of sugar bearing juices; and one of the objects of the invention is the provision of a method for accelerating the settling rates of first carbonation juice. Another object of the invention is the provision of a method of carrying on the carbonation at a higher alkalinity to secure improved juice quality.

My invention possesses other objects and features of value, some of which, with the foregoing, will be set forth in the following description of my invention. It is to be understood that I do not limit myself to the showing made by the said description, as I may adopt variant forms of my invention within the scope of the appended claims.

In the manufacture of sugar from sugar beets, the sugar and diffusible impurities are diffused from the sliced beets in a diffusion battery or continuous diffusion apparatus. The resulting extract is called "raw juice" or diffusion juice. The impurities in the diffusion juice interfere with the crystallization of sugar in subsequent operations, they tend to contaminate and lower the value of the crystallized sugar; and they foul heating surfaces and other equipment.

For these reasons it is necessary that as great a proportion as possible of the impurities in the diffusion juice be eliminated. In all modern practice, this purification is effected by the process known as carbonation, which comprises the addition of lime to the diffusion juice, and simultaneously or subsequently adding carbon dioxide to precipitate the lime as calcium carbonate.

The lime is essentially calcium hydroxide; and may be added as milk of lime, or as a slurry of slaked lime in hot water, or in sweetwater which is a dilute impure sugar solution. If the Steffen molasses recovery process is used in the factory, the lime is added as the product of the Steffen house, saccharate milk, or a slurry in hot water or in sweetwater of "calcium saccharates," which are poorly defined molecular combinations of sugar and lime.

According to modern practice, lime is added by weight expressed as CaO, equal to about 2% of the weight of the juice. Carbon dioxide is added to react with and precipitate the lime until the residual alkalinity expressed as weight of CaO is from 0.040 percent to 0.140 percent of the weight of juice.

Purification is effected in three ways:

(1) The alkaline calcium oxide reacts with organic acid impurities and renders them insoluble.

(2) Many soluble impurities of high molecular weight, and colloidal impurities are coagulated and rendered insoluble by the high alkalinity in carbonation.

(3) Impurities are absorbed on the surface of the calcium carbonate floc, which results from the reaction between lime and carbon dioxide.

The result of the carbonation process is an increase in purity, defined as the ratio of sugar to solids in the juice; a decrease in color; a decrease in colloidal content; and a decrease in soluble lime salts.

The carbonation process is carried out in two stages commonly called first and second carbonation. In the first stage, the alkalinity is usually carried as high as the settling and filtration equipment will satisfactorily process at the operating rate desired, because beneficial effects of carbonation are enhanced if the alkalinity of carbonation is kept high. The filtrate or clear juice from first carbonation is carbonated to the optimum alkalinity; and the resulting precipitate is filtered, without settling, on pressure filters.

It is necessary after first carbonation to remove the voluminous precipitate of calcium carbonate by filtration or, as in the more general modern practice in the United States, by settling and filtration. However, high alkalinity in carbonation is inimical to fast settling rates. Thus the available area of settling equipment sets limits on carbonating at the high alkalinity which would otherwise be optimum for juice quality.

By the practice of my invention, I am able to accelerate settling rates of first carbonation juice, with the dual purpose of increasing settling capacity (and hence factory capacity), and of operating at a higher alkalinity so that juice quality is improved.

My process consists of adding to and thoroughly mixing with the sugar bearing juice and preferably to the carbonated juice before it flows into the settler, a small amount of a dilute solution of a material chosen from the following natural or synthetic gums: algin (alginic acid or one of its salts), propylene glycol ester of algin, Irish moss gum, gum arabic, gum karaya and carboxy methyl cellulose. Algin in the form of sodium alginate is selected for use as herein described.

To be effective, the algin must be dispersed in a dilute solution. A solution having a concentration of even 1.0% of algin is ineffective.

Acceleration of settling has been secured by addition of algin in the range of ½ part per million to 500 parts per million on juice. An addition of 2 p. p. m. on juice is near the optimum.

Using around 2 p. p. m., the settling rate of the carbonation mud is increased up to four or five times the rate of untreated juice. The factors that make for good settling quality, also tend to make for susceptibility to algin. That is, the maximum benefit is realized on a juice which already settled well. On extremely recalcitrant juices, on the other hand, the algin may not work at all.

There are however substantial benefits to be had by the use of algin on intermediate juices, so as to give increased capacity in the factory, and at the same time permit operation at a higher carbonation alkalinity, with resulting improved sugar quality.

In addition to the improvement in the bulk settling rate, is the fact that the overflow from the settling of algin treated juices is clearer. In one series of tests it was found that the mud in the treated overflow was reduced to 53% of its original value.

The cost of treatment at the present time is about $5.00 per 1,000 tons of beets processed. The advantages are a greater purification of the juice, increased capacity of the settling equipment which permits higher rates of operation with the attendant economies.

The filtration rate of the mud is slightly increased with easier washing of the cake which results in lower sugar loss in filter cake.

I claim:

1. In the process of removing impurities from sugar-bearing raw juices by liming and carbonating said juices, the improvement which consists of adding a solution containing less than 1.0 percent of a material selected from the group consisting of alginic acid, the propylene glycol ester of alginic acid, Irish moss gum, gum karaya, and carboxymethylcellulose to sugar-bearing first carbonation juices in such quantity that the amount of material added is in the range of ½ part per million to 500 parts per million parts by weight of said sugar-bearing first carbonation juices, to increase the settling rate of the impurities in said first carbonation juices.

2. In the process of removing impurities from sugar-bearing raw juices by liming and carbonating said juices, the improvement which consists of adding a solution containing less than 1.0 percent algin to sugar-bearing first carbonation juices in such quantity that the amount of material added is in the range of ½ part per million to 500 parts per million parts by weight of said sugar-bearing first carbonation juices to increase the settling rate of impurities in said first carbonation juices.

3. The process for increasing the settling rate of impurities in highly alkaline first carbonation juices which comprises adding to the juice after first carbonation of the juice about 2 parts per million, by weight, of a soluble algin.

4. The process for accelerating settling of impurities from highly alkaline first carbonated sugar juices comprising mixing with the solution after the first carbonation from one-half to five hundred parts by weight of a soluble algin per million parts of juice.

5. The improvement in removing impurities from sugar-bearing first carbonation juice comprising first carbonating the juice until highly alkaline and then mixing an additive with the juice in the proportion of one-half to five hundred parts of additive per million parts by weight of the juice, said additive being selected from the group consisting of alginic acid, a soluble salt of alginic acid, the propylene glycol ester of alginic acid, Irish moss gum, gum karaya, and carboxymethylcellulose, said additive functioning to accelerate precipitation and coagulation of impurities in the juice.

6. The process of claim 5 in which the additive is mixed with the first carbonation juice in the proportion of two parts of additive to one million parts of the juice, by weight.

7. Process of claim 5 wherein the limed sugar-bearing juices are carbonated until the alkalinity thereof, expressed as weight of CaO, is about 0.140 percent based on the weight of the juice.

References Cited in the file of this patent

UNITED STATES PATENTS

| Number | Name | Date |
|---|---|---|
| 1,515,968 | Ricard | Nov. 18, 1924 |
| 1,538,003 | Ricard | May 19, 1925 |
| 1,538,004 | Ricard | May 19, 1925 |

OTHER REFERENCES

Spencer-Meade, Cane Sugar Handbook, 8th ed., New York, 1945, page 814, fourth line from bottom.